March 17, 1942.                W. M. GIBBS                2,276,834
                            JOURNAL LUBRICATION
            Filed Aug. 26, 1939              2 Sheets-Sheet 1
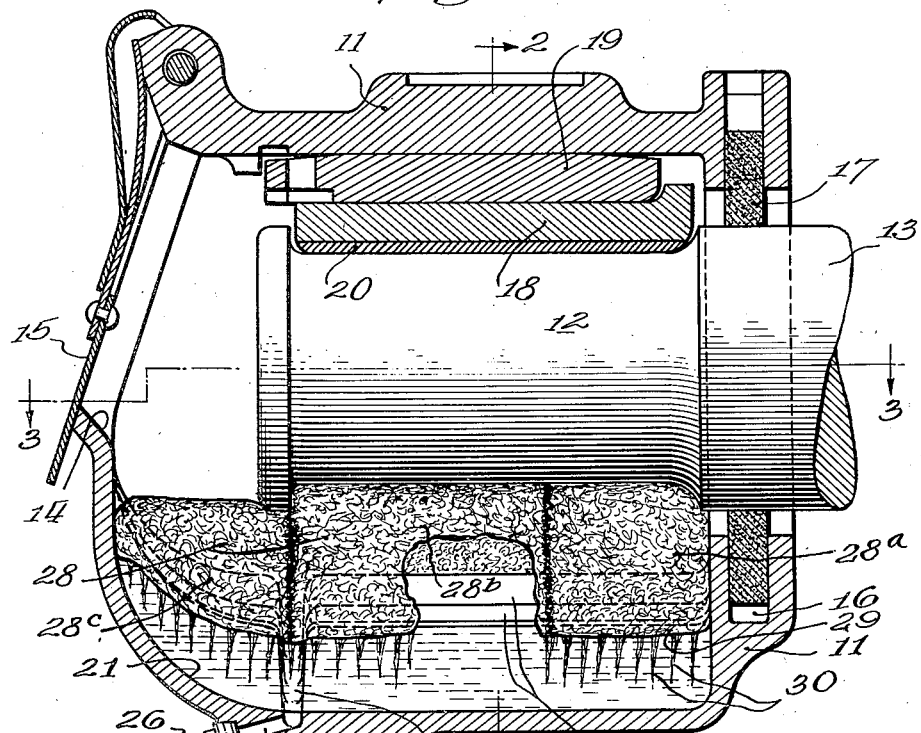
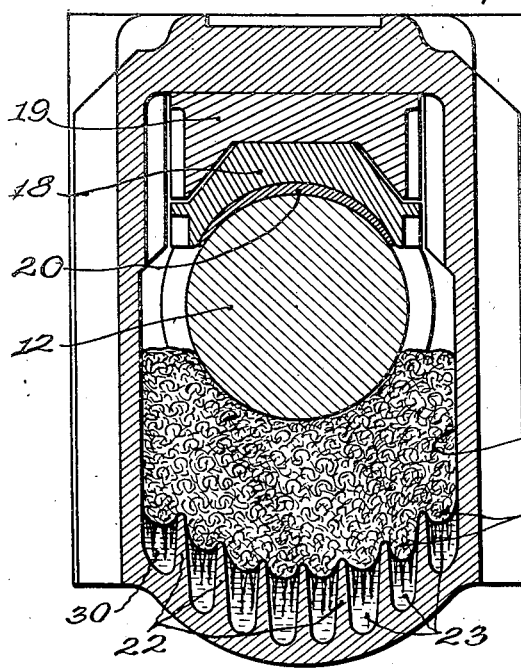
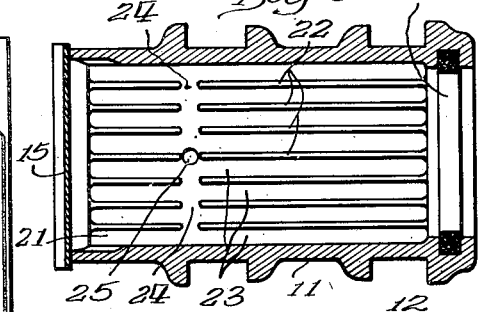
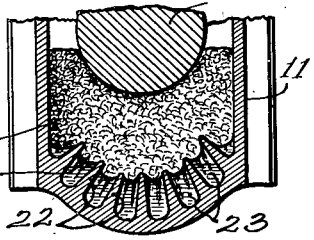
Inventor:
Walter M. Gibbs
By Williams, Bradbury,
McCaleb & Hinkle Attys March 17, 1942. W. M. GIBBS 2,276,834
JOURNAL LUBRICATION
Filed Aug. 26, 1939 2 Sheets-Sheet 2
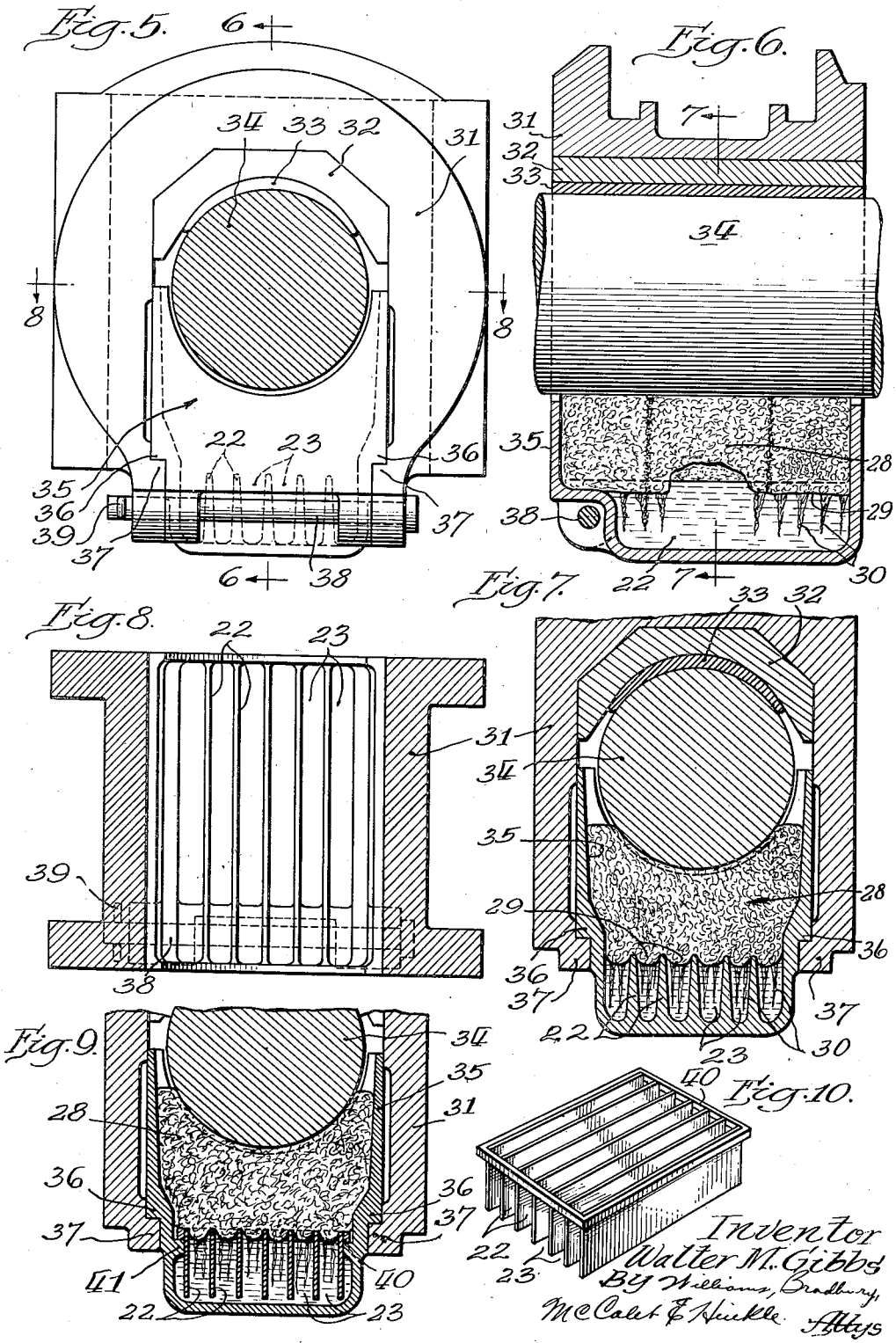

Patented Mar. 17, 1942

2,276,834

UNITED STATES PATENT OFFICE 2,276,834

JOURNAL LUBRICATION

Walter M. Gibbs, Chicago, Ill.

Application August 26, 1939, Serial No. 291,997

1 Claim. (Cl. 308—89.1)

My invention contemplates and realizes certain important improvements in journal lubrication as effected with the aid of oil soaked waste packings in car journal boxes, engine truck boxes, and engine trailer boxes, etc.

One of the objects of my invention is to provide a car journal box, engine truck box or engine trailer box, or the like, as the case may be, which contains no less than the usual amount of appropriately packed waste, which contains much more than the usual quantity of oil, and which is constructed and adapted to support the waste in proper lubricating relation to the journal and in water discharging relation to an underlying supply of oil from whence the waste is at all times kept satisfactorily oil soaked by capillary attraction or by a combination of capillary attraction and upswirls of the oil supply, against the lower surfaces of the packing, caused by the ordinary jolts and jars of traffic.

Another object of my invention is to support the oil soaked waste packing, as and for the purposes specified in the last preceding paragraph, by simple but sturdy means which in no way hampers placement or removal of the packing, but which does act to prevent bodily shifts of packing, in the direction of journal rotation, which tend to cause faulty lubrication and waste grabs.

Another object of my invention is to support the oil soaked waste, as and for the purposes previously mentioned, by means which cooperates with the waste to divide a substantial quantity of reserve oil into a plurality of smaller and more or less confined, but preferably communicating, bodies of oil in order to prevent that wasteful escape and loss of oil from the box which occasionally would occur if the entire supply of reserve oil were permitted to surge and swirl in the box as one liquid entity.

Another object of the invention is to provide means for withdrawing from the reserve supply of oil such water as is discharged into the oil from the waste packing.

These and other features, objects and advantages of my invention will appear from the follow detailed description wherein reference is made to the accompanying drawings, in which—

Fig. 1 is a vertical longitudinal sectional view of a car journal box embodying the improvements of the present invention, a fragment of the principal packing body being broken away to reveal some of the upwardly projecting fins which it otherwise would conceal from view;

Fig. 2 is a vertical transverse sectional view taken in the plane of the line 2—2 of Fig. 1;

Fig. 3 is a sectional view on reduced scale taken in the horizontal planes of the lines 3—3 of Fig. 1, this view omitting the journal and the waste packing;

Fig. 4 is a fragmentary detail view somewhat similar to Fig. 2, but illustrating a modified form of the invention;

Fig. 5 is an end elevational view (journal in section) of an engine truck box including a cellar embodying the improvements of the present invention;

Fig. 6 is a longitudinal vertical sectional view (journal in elevation) taken in the plane of the line 6—6 of Fig. 5;

Fig. 7 is a vertical sectional view taken in the plane of the line 7—7 of Fig. 6;

Fig. 8 is a horizontal sectional view (journal omitted) taken in the plane of the line 8—8 of Fig. 5;

Fig. 9 is a vertical sectional view generally similar to Fig. 7, but depicting another embodiment of my invention; and Fig. 10 is an isolated perspective view of the removable grid which is a salient feature of the combination depicted in Fig. 9.

Similar characters of reference refer to similar parts throughout the several views.

In Figs. 1 to 3, numeral 11 denotes a box for the journal 12 of an axle 13. Such box comprises the usual opening 14 normally closed by cover 15, and the usual dust guard well 16 in which is located a suitable dust guard indicated as a whole at 17.

At 18 is shown the usual bearing brass which acts between the journal 12 and wedge 19 and is provided with Babbitt lining 20. As thus far described the box 11 is or may be conventional.

The journal box 11 of the present invention differs from the conventional journal box in that it has an extraordinarily deep cellar or sump 21 from the bottom of which rises a multiplicity of fins 22. Such fins are shown as cast integral with the box, as equidistantly spaced from each other, and as extending in parallelism with the journal axis and each other from the front wall of the box to the rear wall thereof.

Such fins 22 divide the lower part of the cellar or sump 21 into a plurality of definitely defined oil channels 23 which, however, intercommunicate through the passages 24 which are formed in the several fins 22. The passages 24 preferably extend throughout the heights of the several fins in order to facilitate their formation as an incident to the casting of the box. Moreover, the fins 22 preferably have cross sections which taper upwardly to facilitate casting of the fins as integral parts of the box and, incidentally, to give them greatest strength where they need it most, i. e., where they join the box bottom.

Communicating with a low part of the cellar or sump 21 is a drain passage 25 normally closed by a plug 26. The passage 25 preferably extends through the jack pad 27, and such plug preferably is disposed well above the lower surface of the jack pad.

In preparing the journal box for use, oil is poured into the cellar or sump in quantity sufficient to fill or substantially fill the several channels 23. Then the usual quantity of oil soaked waste 28 is packed into the box and caused to rest upon the several fins 22. The waste packing, as shown in the drawings, may be regarded as consisting of three portions in accordance with approved present day railway practice, i. e., the back roll 28—a, the principal packing body 28—b, and the front plug 28—c.

Since the several fins extend lengthwise of the box, they do not hamper placement of the waste packing into the box or its removal therefrom. But they do act to prevent bodily shifts of the waste packing in the direction of journal rotation (shifts which would impair proper lubrication of the journal or even eventuate in a waste grab). This is so because certain portions of the oil soaked waste, as it rests upon the fins 22, enter the channels 23 in the form of anchoring ribs 29. Such anchoring ribs 29 also serve as oil absorbing plugs for the tops of the several channels 23 and thus tend to prevent that violent surging and swirling of the oil, which under certain conditions would occur in traffic, were the oil not divided into a plurality of relatively small portions which are more or less confined. A great many threads 30 invariably depend from the anchoring ribs 29 and thus insure that the waste packing is kept saturated with oil, by capillary attraction, even when the journal is at rest. Under traffic conditions the waste packing is kept thoroughly saturated with oil by a combination of capillary attraction and minor upswirls of the oil in the several channels 23 against the several anchoring ribs 29.

Any water which may be present in the waste at any time is discharged by gravity from the waste and sinks to the lowermost parts of the cellar or sump from whence it may be withdrawn through the drain passage 25.

That embodiment of my invention which is depicted in Fig. 4 differs only from the embodiment of the preceding figures in that the several fins 22 are so formed as to project upwardly from the box bottom in converging lines—somewhat to improve their effectiveness in cooperating with the anchoring ribs 29 in the prevention of shifts of the waste packing in the direction of journal rotation.

In Figs. 5, 6, 7, and 8, numeral 31 designates an engine truck box which is provided with the usual brass 32 having Babbitt lining 33 for cooperation with the journal 34. The removable cellar 35 with which the present invention is particularly concerned is provided with shoulders 36 resting on complementary shoulders 37 formed on those parts of the box frame by which the cellar is embraced. The cellar is retained in the box by locking pin 38 held in position by cotter key 39.

The cellar 33 differs from the cellar of a conventional engine truck box in that it is substantially deeper and has rising from its bottom a plurality of ribs 22 which perform the same functions as the similarly designated ribs of that embodiment of my invention illustrated in Figs. 1 to 3 inclusive. Since the cellar 35 is removable, it is not necessary that the channels 23, defined by its ribs 22, intercommunicate, although they may do so if desired. Neither is it necessary that the cellar 35 be provided with a drain passage corresponding with the one indicated at 25 in Fig. 1. In this embodiment of my invention, the reserve supply of oil contained, in the several channels 23, replenishes the waste packing with oil by capillary attraction due to the presence of depending threads 30, and by contact with the anchoring ribs 29.

That embodiment of my invention shown in Fig. 9 differs essentially from the structure of Figs. 5 to 8 inclusive only in that the fins 22 are removable from the cellar 35, are preferably of uniform cross section, and are preferably parts of a one piece grid which comprises an upper marginal shoulder 40 resting upon a complementary shoulder 41 formed on and projecting inwardly from the walls of cellar 35.

Having thus illustrated and described my invention in several practical embodiments thereof, what I claim is new and desire to secure by Letters Patent of the United States, is:

In a journal box for railway vehicles, a member having top, sides and bottom and having an aperture for reception of the journal, said box having a recess to be located below the journal in said box for the reception of waste and lubricant, the walls of said recess extending upward on all sides to the journal, said recess having its lower wall provided with a multiplicity of upwardly extending flanges, said flanges extending longitudinally of the axis of the journal and having their upper edges regularly spaced to effect a uniform support of waste in the recess below the journal, the spaces between said flanges forming a multiplicity of elongated deep grooves for receiving lubricant, the flanges segregating the lubricant into a multiplicity of separate bodies to prevent swirling and loss of lubricant through the journal box apertures under the shocks of traffic and a packing of waste adapted to be located under the journal and engaging the journal, said waste engaging the upper edges of said flanges and having threads depending into the lubricant between said flanges, the waste being compressed between the edges of said flanges and said journal, whereby the grab and shifting of waste by the action of the journal is substantially prevented and the lubricant is maintained in the journal box and fed to the journal by capillary action of the waste, said flanges having a common point of separation intermediate their length forming a transverse groove in said bottom whereby the chambers between the flanges all communicate with said groove, said groove having a discharge aperture located at its lowest point.

WALTER M. GIBBS.